US006872460B2

(12) United States Patent
Murschall et al.

(10) Patent No.: US 6,872,460 B2
(45) Date of Patent: *Mar. 29, 2005

(54) MATT, UV-STABLE, THERMOFORMABLE, CO-EXTRUDED POLYESTER FILM, A METHOD FOR THE PRODUCTION THEREOF AND THE USE OF THE SAME

(75) Inventors: Ursula Murschall, Nierstein (DE); Ulrich Kern, Ingelheim (DE); Guenther Crass, Taunusstein (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/181,537

(22) PCT Filed: Jan. 10, 2001

(86) PCT No.: PCT/EP01/00209

§ 371 (c)(1), (2), (4) Date: Jul. 18, 2002

(87) PCT Pub. No.: WO01/53087

PCT Pub. Date: Jul. 26, 2001

(65) Prior Publication Data

US 2003/0108755 A1 Jun. 12, 2003

(30) Foreign Application Priority Data

Jan. 20, 2000 (DE) .......................... 100 02 169

(51) Int. Cl.⁷ .................. B32B 27/08; B32B 27/18; B32B 27/36; B32B 31/30
(52) U.S. Cl. .................. 428/480; 428/910; 525/437; 525/444; 525/448; 264/228.4; 264/290.2; 528/293; 528/294; 528/295; 528/302; 528/305; 528/308; 528/308.5
(58) Field of Search .................. 428/480, 910; 525/437, 444, 448; 264/288.4, 290.2; 528/293, 294, 295, 302, 305, 308, 308.5

(56) References Cited

U.S. PATENT DOCUMENTS

| | | | | |
|---|---|---|---|---|
| 3,322,716 | A | * 5/1967 | Klein et al. | .................. 524/135 |
| 3,563,942 | A | 2/1971 | Heiberger | |
| 3,779,993 | A | 12/1973 | Kibler et al. | |
| 4,102,853 | A | * 7/1978 | Kawamura et al. | .......... 524/425 |
| 4,252,885 | A | 2/1981 | McGrail et al. | |
| 4,399,179 | A | 8/1983 | Minami et al. | |
| 5,073,435 | A | 12/1991 | Eyraud et al. | |
| 5,173,357 | A | * 12/1992 | Nakane et al. | ............... 428/220 |
| 5,248,713 | A | * 9/1993 | Lunk et al. | ................... 524/120 |
| 5,674,947 | A | * 10/1997 | Oishi et al. | ................... 525/289 |
| 5,972,445 | A | * 10/1999 | Kimura et al. | .............. 428/35.4 |
| 6,270,888 | B1 | * 8/2001 | Rutter et al. | ................. 428/347 |
| 6,358,604 | B1 | * 3/2002 | Peiffer et al. | ................ 428/336 |
| 6,627,295 | B2 | * 9/2003 | Peiffer et al. | ................ 428/141 |
| 2002/0068158 | A1 | * 6/2002 | Peiffer et al. | ................ 428/220 |
| 2002/0068159 | A1 | * 6/2002 | Peiffer et al. | ................ 428/220 |
| 2002/0071945 | A1 | * 6/2002 | Peiffer et al. | ................ 428/220 |
| 2002/0114944 | A1 | * 8/2002 | Peiffer et al. | ................ 428/336 |
| 2003/0087105 | A1 | * 5/2003 | Murschall et al. | ....... 428/423.7 |
| 2003/0157352 | A1 | * 8/2003 | Murschall et al. | .......... 428/483 |
| 2003/0180560 | A1 | * 9/2003 | Peiffer et al. | ................ 428/480 |

FOREIGN PATENT DOCUMENTS

| | | |
|---|---|---|
| EP | 0 144 878 A2 | 6/1985 |
| EP | 0 144 978 A2 | 6/1985 |
| EP | 0 296 620 A2 | 12/1988 |
| EP | 0 346 647 A1 | 12/1989 |
| EP | 0 584 044 A1 | 2/1994 |
| EP | 0 587 148 A2 | 3/1994 |
| EP | 0 602 964 A1 | 6/1994 |
| EP | 0 620 245 A1 | 10/1994 |
| EP | 0826 478 A2 | 3/1998 |
| EP | 0 976 548 A2 | 2/2000 |
| GB | 2 344 596 A * | 6/2000 |
| WO | WO 94/13476 A1 | 6/1994 |
| WO | WO 94/13481 A1 | 6/1994 |
| WO | WO 98/06575 * | 2/1998 |

OTHER PUBLICATIONS

Schimtz, Peter et al., "Films." Ullmann's Encyclopedia of Industrial Chemistry, 5th Ed., vol. A11 (1988), pp. 85–95, 108–110.*

Carl Hanser Verlag, Kunststoff Handbuch [Plastics Handbook], "Photochemical Degradation of Poly (ethylene Terephthalate). III. Determination of Decomposition Products and Reaction Mechanisim", vol. III, Polyesters, Munich, Germany.

H. Day, D. M. Wiles, Journal Applied Polymer Science, vol. 16, p. 203, 1972.

* cited by examiner

Primary Examiner—Vivian Chen
(74) Attorney, Agent, or Firm—ProPat, L.L.C.

(57) ABSTRACT

The invention relates to biaxially oriented, co-extruded polyester films. Said films comprise a base layer which consists of at least 70% by weight of a thermoplastic polyester, preferably polyethylene terephthalate (PET) with a diethylene glycol and/or polyethylene glycol content greater than 1.3% by weight and have at least one matt outer layer and optionally additional intermediate layers. The films also contain at least one UV-absorber, preferably hydroxy benzotriazoles and triazines. The films are characterized by high UV-stability, no embrittlement after exposure to temperature, a matt surface devoid of unwanted clouding and excellent thermoforming properties and are, together with the molded bodies produced therefrom, suitable for numerous interior and exterior applications. The (matt) outer layers can be identical or different and contain a mixture or a blend of a component I which consists of PET homopolymers and/or copolymers and a component II which is a copolymer resulting from the condensation product of isophthalic acid, an aliphatic dicarboxylic acid and a sulfomonomer with a copolymerizable aliphatic or cycloaliphatic glycol.

23 Claims, No Drawings

MATT, UV-STABLE, THERMOFORMABLE, CO-EXTRUDED POLYESTER FILM, A METHOD FOR THE PRODUCTION THEREOF AND THE USE OF THE SAME

The invention relates to a biaxially oriented polyester film which has a base layer preferably composed of at least 70% by weight of a thermoplastic polyester and which is thermoformable, and comprises at least one UV absorber, and has at least one matt outer layer which comprises a mixture or a blend made from two components I and II. The invention further relates to the use of the film and to a process for its production.

Component I of the mixture or of the blend is preferably a polyethylene terephthalate homopolymer or polyethylene terephthalate copolymer or a mixture made from polyethylene terephthalate homo- and/or copolymers.

Component II of the mixture or of the blend is a polyethylene terephthalate copolymer which is composed of the condensation product of the following monomers or of their derivatives capable of forming polyesters: isophthalic acid, aliphatic dicarboxylic acid, sulfomonomer which contains a metal sulfonate group on the aromatic moiety of an aromatic dicarboxylic acid, and aliphatic or cycloaliphatic glycol.

The outer layer has a matt surface or appearance. The film of the invention is highly suitable for use as a packaging film or as a molding, or for applications in the industrial sector, where a particular requirement is UV protection or impermeability to UV light.

BACKGROUND OF THE INVENTION

There is high industrial demand for transparent, high-gloss plastic films, e.g. biaxially oriented polypropylene films or biaxially oriented polyester films. Alongside this, there is increasingly a requirement for these transparent films and moldings where protection is afforded from ultraviolet radiation and where at least one surface layer does not have high gloss but has a characteristic matt appearance, giving the application or the moldings an appearance which is particularly attractive and therefore effective for promotional purposes, and giving them protection from UV radiation.

EP 346 647 describes a biaxially oriented polyester film which comprises at least one outer layer which comprises a concentration of from 0.5 to 50% of a filler, the diameter of this filler having a particular ratio to the thickness of the outer layer. The outer layer also has a particular thickness and a particular degree of crystallization, determined with the aid of Raman spectroscopy.

U.S. Pat. No. 4,399,179 describes a coextruded biaxially oriented polyester film which is composed of a transparent base layer and of at least one matt layer which essentially consists of a particular polyethylene terephthalate copolymer, and also comprises a concentration of from 3 to 40% of inert particles with diameter of from 0.3 to 20 $\mu$m. The specific copolymer is a processing aid which reduces the viscosity of the melt comprising the inert particles, permitting satisfactory extrusion of this layer. Addition of the inert particles to the appropriate layer gives the film its mattness. The particles impair transparency.

EP 0 144 978 describes a self-supporting oriented film made from thermoplastic and bearing, on at least one of its two surfaces, a continuous polyester coating which is applied in the form of an aqueous dispersion to the film prior to the final stretching step. The polyester coating is composed of a condensation product of various monomers or of their derivatives capable of forming polyesters, for example isophthalic acid, aliphatic dicarboxylic acid, sulfomonomers, and aliphatic or cycloaliphatic glycol.

EP-A-0 620 245 describes films with improved heat resistance. These films comprise antioxidants suitable for scavenging free radicals formed within the film and degrading any peroxide formed. That specification does not, however, provide any proposal as to how the UV resistance of these films may be improved.

The prior art described gives no indication that the films are thermoformable, or as to how at least one surface of the film may be provided with low gloss while retaining high transparency, or that the film absorbs UV light, or that the film has high UV resistance.

It was an object of the present invention, therefore, to provide a coextruded biaxially oriented and transparent polyester film which has at least one matt outer layer and is simple and cost-effective to produce, and has the good physical properties of known films, and moreover in particular absorbs UV light and has high UV resistance, and also has good thermoformability. The film should also cause no problems of disposal.

BRIEF DESCRIPTION OF THE INVENTION

The object is achieved by means of a biaxially oriented polyester film which has a base layer preferably composed of at least 70% by weight of a thermoplastic polyester and which is thermoformable, and comprises at least on UV absorber, and has at least one matt outer layer which comprises a mixture or a blend made from two components I and II. The invention further relates to the use of the film and to a process for its production.

DETAILED DESCRIPTION OF THE INVENTION

High UV resistance means that sunlight or other UV radiation causes no damage, or only extremely slight damage, to the film, and that the films are therefore suitable for outdoor applications and/or critical indoor applications. In particular, it is intended that the films do not yellow after a number of years of outdoor use, nor embrittle or show surface cracking, nor have impaired mechanical properties. High UV resistance therefore means that the film absorbs UV light and does not transmit light until the visible region has been reached.

Adequate thermoformability means that, without uneconomic predrying, the film can be thermoformed on commercially available thermoforming machinery to give complex and large-surface-area moldings.

The good mechanical properties include, inter alia, high modulus of elasticity ($E_{MD}$>3200 N/mm$^2$; $E_{TD}$>3500 N/mm$^2$) and good values for tensile stress at break (in MD>100 N/mm$^2$; in TD>130 N/mm$^2$). Good orientability includes the capability of the film to give excellent orientation during its production, both longitudinally and transversely, without break-offs.

For the purposes of the present invention, mixtures, particularly with regard to the outer layer(s), are mechanical mixtures produced from the individual components. For this, the individual constituents are generally combined in the form of small-dimension compressed moldings, e.g. lenticular or bead-shaped pellets, and mixed with one another using a suitable agitator. Another way of producing the mixture is for each of the components I and II in pellet form to be fed separately to the extruder for the outer layer according to the invention and for mixing to take place in the extruder and/or in the downstream systems for transporting the melt.

For the purposes of the present invention a blend is an alloy-like composite of the individual components I and II which can no longer be separated into the initial constituents. A blend has properties like those of a homogeneous material and can be characterized by appropriate parameters.

According to the invention the film has at least two layers. Its layers are then a base layer B and the outer layer A according to the invention. In another preferred embodiment of the invention the film has a three-layer structure and has the outer layer A on one side of the layer B and another layer C on the other side of the layer B. In this case the two layers A and C form the outer layers. These may be identical or different. According to the invention, the UV absorber and the flame retardant may be present in the outer layer(s) and/or the base layer and/or in any intermediate layers present.

The base layer B of the film preferably is composed of at least 70% by weight of a thermoplastic polyester. Polyesters suitable for this are those made from ethylene glycol and terephthalic acid (=polyethylene terephthalate, PET), made from ethylene glycol and naphthalene-2,6-dicarboxylic acid (=polyethylene 2,6-naphthalate, PEN), made from 1,4-bishydroxymethylcyclohexane and terephthalic acid (=poly-1,4-cyclohexanedimethylene terephthalate, PCDT), and also those made from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters composed of at least 90 mol %, in particular at least 95 mol %, of ethylene glycol units and terephthalic acid units or of ethylene glycol units and naphthalene-2,6-dicarboxylic acid units. The remaining monomer units derive from other aliphatic, cycloaliphatic or aromatic diols and, respectively, dicarboxylic acids, as may also be present in layer A (and/or layer C).

Examples of other suitable aliphatic diols are diethylene glycol, triethylene glycol and aliphatic glycols of the general formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention may be made of cyclohexanediols (in particular 1,4-cyclohexanediol). Other suitable aromatic diols have, for example, the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also highly suitable.

It is important for the invention that the crystallizable thermoplastic has a diethylene glycol content (DEG content) of $\geq 1.0\%$ by weight, preferably $\geq 1.2\%$ by weight, in particular $\geq 1.3\%$ by weight, and/or a polyethylene glycol content (PEG content) of $\geq 1.0\%$ by weight, preferably $\geq 1.2\%$ by weight, in particular $\geq 1.3\%$ by weight, and/or an isophthalic acid content (IPA content) of from 3 to 10% by weight.

The DEG content and/or PEG content of the polyester is advantageously set by the raw material producer during the polymerization process.

It was more than surprising that the fact that the diethylene glycol content and/or polyethylene glycol content and/or IPA content in the film is higher than in standard thermoplastics makes the film capable of cost-effective thermoforming on commercially available thermoforming plants and leads to excellent reproduction of detail by the film.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) and stilbene-x,x'-dicarboxylic acids. Among the cycloaliphatic dicarboxylic acids, mention may be made of cyclohexane dicarboxylic acids (in particular cyclohexane-1,4-dicarboxylic acid). Particularly suitable aliphatic dicarboxylic acids are the $C_3$–$C_{19}$ alkanediacids, where the alkane moiety may be straight-chain or branched.

The polyesters of the invention may be prepared, for example, by the transesterification process. The starting materials for this are dicarboxylic esters and diols, and these are reacted with the usual transesterification catalysts, such as zinc salts, calcium salts, lithium salts, magnesium salts and manganese salts. The intermediates are then polycondensed in the presence of widely used polycondensation catalysts, such as antimony trioxide or titanium salts. The preparation may equally take place by the direct esterification process in the presence of polycondensation catalysts. This process starts directly from the dicarboxylic acids and diols (Kunststoff Handbuch [Plastics Handbook], Vol. III, Polyesters, Carl Hanser Verlag, Munich).

At least one matt outer layer of the multilayer film of the invention comprises a blend or mixture described in more detail below, made from two components I and II, and, where appropriate, comprises additives.

Component I of the outer layer mixture or of the blend essentially consists of a thermoplastic polyester, in particular a polyester of this type as described in more detail for the base layer. For producing a high degree of mattness here, it has proven advantageous for the polyester for component I of the outer layer to have a viscosity which is per se relatively low. To describe the viscosities of the melts use is made of a modified solvent viscosity (SV or standard viscosity). For commercially available polyethylene terephthalates suitable for producing biaxially oriented films the SVs are from 500 to 1200. To obtain high mattness of the film for the purposes of the present invention it has proven advantageous for the SV of the polymers for component I of the outer layer to be in the range from 500 to 800, preferably in the range from 500 to 750, particularly preferably in the range from 500 to 700.

Component II of the mixture or of the blend of the outer layer is a polyethylene terephthalate copolymer which is composed of the condensation product of the following monomers or of their derivatives capable of forming polyesters:

A) from 65 to 95 mol % of isophthalic acid;
B) from 0 to 30 mol % of at least one aliphatic dicarboxylic acid with the formula

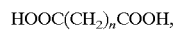

where
n is from 1 to 11, preferably 1 to 9;
C) from 5 to 15 mol % of at least one sulfomonomer comprising an alkali metal sulfonate group on the aromatic moiety of a dicarboxylic acid; and
D) a copolymerizable aliphatic or cycloaliphatic glycol having from 2 to 11 carbon atoms, preferably from 2 to 9 carbon atoms, in the stoichiometric amount necessary to form 100 mol % of condensate;

The percentages given are preferred values and are based in each case on the total amount of the monomers forming component II.

The total amount of molar acid equivalents present are to be essentially the same as the total amount of molar glycol equivalents present.

Examples of dicarboxylic acids suitable as component B) of the copolyesters are malonic, adipic, azelaic, glutaric, sebacic, suberic, succinic, and brassylic acid, and also mixtures of these acids or of their derivatives capable of forming polyesters. Of the acids mentioned, preference is given to sebacic acid.

Examples of sulfomonomers (component C) which contain a metal-sulfonate group on the aromatic moiety of an aromatic dicarboxylic acid are monomers of the following general formula:

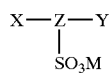

In this formula

M is a monovalent cation of an alkali metal, preferably Na$^+$, Li$^+$ or K$^+$, Z is a trivalent aromatic radical, and X and Y are carboxyl groups or polyester-forming equivalents.

Monomers of this type have been described in U.S. Pat. Nos. 3,563,942 and 3,779,993. Examples of such monomers are the sodium salts of sulfoterephthalic acid, 5-sulfoisophthalic acid, sulfophthalic acid, 5-(p-sulfophenoxy)isophthalic acid, 5-sulfopropoxyisophthalic acid and similar monomers, and also their derivatives, such as the dimethyl esters, capable of forming polyesters.

The term "derivatives capable of forming polyesters" here means reaction participants with groups capable of condensation reactions, in particular transesterification reactions, to form polyester bonds. Groups of this type include carboxyl groups and also the lower alkyl esters of these, e.g. dimethyl terephthalate, diethylterephthalate and numerous other esters, halides or salts. The acid monomers are preferably used in the form of dimethyl esters, since this gives better control of the condensation reaction.

Examples of glycols suitable as component D) are ethylene glycol, 1,5-pentanediol, 1,6-hexanediol, neopentyl glycol, 1,10-decanediol, cyclohexanedimethanol and similar substances. Preference is given to the use of ethylene glycol.

The copolyesters of component II may be prepared by known polymerization techniques. The method is generally to combine the acid components with glycol and to apply heat in the presence of an esterification catalyst, and then to add a polycondensation catalyst (Kunststoff Handbuch [Plastics Handbook], Vol. VIII, Polyesters, Carl Hanser Verlag, Munich).

The relative proportions of components A, B, C and D used to prepare the blends or mixtures according to the invention have proven decisive for achieving the matt outer layer. For example, at least 65 mol % of isophthalic acid (component A) must be present as acid component. Component A is preferably in the form of pure isophthalic acid, present in amounts of from about 70 to 95 mol %.

For component B, any acid with the formula mentioned gives satisfactory results, and preference is given to adipic acid, azelaic acid, sebacic acid, malonic acid, succinic acid, glutaric acid and mixtures of these acids. If component B is present in the composition the desirable amount within the range given is preferably from 1 to 20 mol %, based on the acid components of the mixture I.

The amount of the glycol component present is approximately stoichiometric.

The copolyesters of component II that are suitable for the purposes of the invention also have an acid value of less than 10, preferably of from 0 to 3, an average molecular weight of below about 50,000 and an SV of from about 30 to 700, preferably from about 350 to 650.

The ratio (by weight) of the two components I and II of the outer layer mixture or of the blend may vary within wide limits and depends on the application intended for the multilayer film. The ratio of components I and II is preferably from I:II=10:90 to I:II=95:5, preferably from I:II=20:80 to I:II=95:5 and in particular from I:II=30:70 to I:II=95:5.

Light, in particular the ultraviolet content of solar radiation, i.e., the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm, and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide, and carboxylic acids. Besides direct photolysis of the ester groups, consideration has to be given to oxidation reactions which likewise form carbon dioxide via peroxide radicals.

In the photooxidation of polyethylene terephthalates there can also be cleavage of hydrogen at the position α to the ester groups, giving hydroperoxides and decomposition products of these, and this may be accompanied by the chain cleavage (H. Day, D. M. Wiles: J. Appl. Polym. Sci. 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are those organic or organometallic compounds which produce no, or only extremely slight, color or color change in the thermoplastic to be stabilized, that is to say those which are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., that is to say they do not decompose and do not cause evolution of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these oxanilides, hydroxybenzoic esters, and sterically hindered amines and triazines, and among these preference is given to the 2-hydroxybenzotriazoles and the triazines.

In one particularly preferred embodiment, the film of the invention comprises from 0.01 to 5.0% by weight of 2-(4,6-diphenyl-1,3,5-triazin-2-yl)-5-hexyloxyphenol of the formula

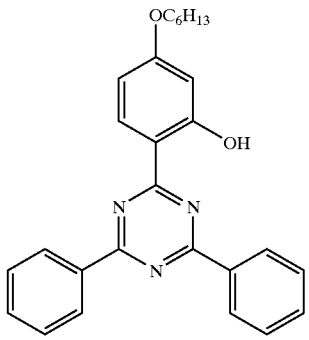

or from 0.01 to 5.0% by weight of 2,2'-methylenebis(6-(2H-benzotriazol-2-yl)-4-(1,1,2,2-tetramethylpropyl)phenol) of the formula

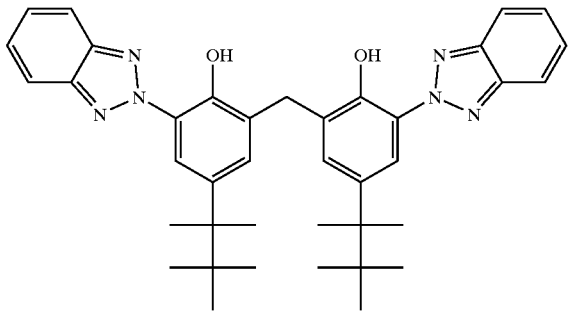

It is also possible in one preferred embodiment to use a mixture of these two UV stabilizers or a mixture of at least one of these two UV stabilizers with other UV stabilizers, the total concentration of light stabilizer preferably being from 0.01 to 5.0% by weight, based on the weight of crystallizable polyethylene terephthalate.

The UV stabilizer(s) is/are preferably present in the outer layer(s). If required, UV stabilizer may also be provided in the core layer.

It was highly surprising that use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available UV stabilizers. It would then have been found that
- the UV stabilizer has unsatisfactory thermal stability and at temperatures of from 200 to 240° C. decomposes and causes evolution of gases, and
- large amounts (from about 10 to 15% by weight) of UV stabilizer have to be incorporated so that the UV light is absorbed and damage to the film is therefore prevented.

At these high concentrations it would have been found that the film is yellow even immediately after its production, with Yellowness Index differences (YI) around 25. It would also have been found that its mechanical properties are adversely affected. Orientation would have produced exceptional problems, for example
- break-offs due to unsatisfactory strength, i.e. modulus of elasticity too low,
- die deposits, causing profile variations,
- roller deposits from the UV stabilizer, causing impairment of optical properties (defective adhesion, non-uniform surface), and
- deposits in scratching frames or heat-setting frames, dropping onto the film.

It was therefore more than surprising that even low concentrations of the UV stabilizer achieve excellent UV protection. It was very surprising that, together with this excellent UV protection
- within the accuracy of measurement, the Yellowness Index of the film is unchanged from that of an unstabilized film;
- there was no evolution of gases and there were no die deposits or frame condensation, and the film therefore has excellent optical properties and excellent profile and layflat, and
- the UV-resistant film has excellent stretchability, and can therefore be produced in a reliable and stable manner on high-speed film lines at speeds of up to 420 m/min.

It was surprising that a relatively high diethylene glycol content and/or polyethylene glycol content in comparison with standard polyester permits oriented PET films to be thermoformed.

The thermoforming process generally encompasses the steps of predrying, heating, molding, cooling, demolding, and heat-conditioning. Surprisingly, it was found that the films of the invention can be thermoformed without predrying. The costs of the forming process are drastically reduced by this advantage over thermoformable polycarbonate films or thermoformable polymethyl methacrylate films, for which predrying times of from 10 to 15 hours at temperatures of from 100 to 120° C. are required, depending on thickness.

Examples of the process parameters found for thermoforming were as follows

| Step of process | Film of invention |
| --- | --- |
| Predrying | Not required |
| Mold temperature ° C. | 100–160 |
| Heating time | <5 sec per 10 μm of thickness |
| Film temperature during shaping ° C. | 160–200 |
| Possible orientation factor | 1.5–2.0 |
| Reproduction of detail | Good |
| Shrinkage % | <1.5 |

The base layer and/or the outer layer(s) and/or the intermediate layers may also comprise conventional additives, such as stabilizers and antiblocking agents. They are usefully added to the polymer or to the polymer mixture before melting. Examples of stabilizers used are phosphorus compounds, such as phosphoric acid or its esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, LiF, the calcium, barium, zinc or manganese salts of the dicarboxylic acids used, carbon black, titanium dioxide, kaolin and crosslinked polystyrene particles or crosslinked acrylate particles.

Mixtures of two or more different antiblocking agents or mixtures of antiblocking agents of the same composition but different particle size may also be used as additives. The particles may be added to the individual layers in the usual concentrations, e.g. as a glycolic dispersion during the polycondensation or via masterbatches during extrusion. Pigment concentrations which have proven particularly suitable are from 0.0001 to 10% by weight, based on the layers in which they are present. Adding these particles to the outer layer(s) gives the further advantageous possibility of varying the degree of mattness of the film. Increasing the pigment concentration is generally also associated with an increase in the degree of mattness of the film. A detailed description of suitable antiblocking agents is found in EP-A 0 602 964, for example.

The present invention also provides a process for producing this film. It encompasses the following steps:
 a) producing a film from base and outer layer(s), and, where appropriate, intermediate layers, by coextrusion,
 b) biaxial orientation of the film, and
 c) heat-setting of the oriented film.

To produce the outer layer(s) according to the invention it is useful to feed pellets of mixing component I and pellets of mixing component II in the desired mixing ratio, and, where appropriate, the UV masterbatch, directly to the extruder. It has proven useful to use a twin-screw extruder for extruding the matt outer layer(s) according to the invention, as described, for example, in EP 0 826 478. The materials can be melted and extruded at about 300° C. and with a residence time of about 5 min. The transesterification reactions which can occur in the extruder under these conditions can form other copolymers from the homopolymers and the copolymers.

The UV absorber may also advantageously be incorporated into the polymers of the outer layers and/or of the base layer before the polymers leave the producer of the raw material.

It is particularly preferable to add the UV absorber by way of masterbatch technology directly during film production. The UV absorber is dispersed in a solid carrier. Carrier materials which may be used are certain resins, the outer layer polymer and/or the base layer polymer itself, or else other polymers which are sufficiently compatible with the thermoplastic.

In masterbatch technology it is important that the grain size and the bulk density of the masterbatch are similar to the grain size and the bulk density of the polymers of the base layer and/or of the outer layer, so that distribution of the UV absorber can be homogeneous and therefore UV resistance can be homogeneous.

The polymers for the base layer are usefully fed via another extruder. Any foreign bodies or contamination present can be filtered out from the polymer melt prior to extrusion. The melts are then extruded via a coextrusion die to give flat melt films and the layers are mutually superposed. The multilayer film is then drawn off and solidified with the aid of a chill roll and, if desired, of other rolls.

The biaxial orientation procedure is generally carried out in succession or simultaneously. For stretching in succession it is preferable for the first orientation to be longitudinal (i.e. in the machine direction) and for this to be followed by transverse orientation (i.e. perpendicularly to the machine direction). This causes orientation of the molecular chains. The longitudinal orientation process can be carried out with the aid of two rolls running at different speeds corresponding to the desired stretching ratio. For the transverse orientation process use is generally made of an appropriate tenter frame.

For the simultaneous stretching process, the film is stretched simultaneously in longitudinal and transverse directions in a tenter frame.

The temperature at which the orientation process is carried out may vary over a relatively wide range and depends on the properties desired in the film. The longitudinal stretching process is generally carried out at from about 80 to 135° C., and the transverse stretching process at from about 90 to 150° C. The longitudinal stretching ratio is generally from 2.5:1 to 6:1, preferably from 3:1 to 5.5:1. The transverse stretching ratio is generally from 3.0:1 to 5.0:1, preferably from 3.5:1 to 4.5:1. If desired, the transverse stretching process may be followed by a further longitudinal orientation process and even a further transverse orientation process.

In the heat-setting process which follows, the film is held at a temperature of from about 150 to 250° C. for from about 0.1 to 10 s. The film is then wound up in a usual manner.

At least one of the surfaces of the film may, furthermore, be coated in such a way that the coating on the finished film has a thickness of from 5 to 100 nm, preferably from 20 to 70 nm, in particular from 30 to 50 nm. The coating is preferably applied in-line, i.e. during the film-production process, usefully prior to the transverse stretching process. A particularly preferred application method is reverse gravure-roll coating, which can apply extremely homogeneous coatings of the thicknesses mentioned. The coatings are preferably applied in the form of solutions, suspensions or dispersions, particularly preferably as aqueous solution, suspension or dispersion. The coatings mentioned give the film surface an additional function, for example render the film sealable, printable, metallizable, sterilizable or antistatic, or improve the aroma barrier, or allow adhesion to materials which would otherwise not adhere to the surface of the film (for example photographic emulsions). Examples of substances/compositions which give additional functionality are:

Acrylates, as described, for example, in WO 94/13476, ethylene-vinyl alcohols, PVDC, water glass ($Na_2SiO_4$), hydrophilic polyesters (PET/IPA polyesters as described, for example, in EP-A-0 144 878, U.S. Pat. No. 4,252,885 or EP-A-0 296 620 and containing the sodium salt of 5-sulfoisophthalic acid), vinyl acetates, as described, for example, in WO 94/13481, polyvinyl acetates, polyurethanes, the alkali-metal or alkaline-earth-metal salts of $C_{10}$–$C_{18}$ fatty acids, butadiene copolymers with acrylonitrile or methyl methacrylate, methacrylic acid, acrylic acid or esters thereof.

The substances/compositions mentioned are applied in the form of dilute solution, emulsion or dispersion, preferably aqueous solution, emulsion or dispersion, to one or both surfaces of the film, and the solvent is then evaporated. If the coatings are applied in-line prior to the transverse stretching process, the heat treatment during the transverse stretching process and the subsequent heat-setting is usually sufficient to evaporate the solvent and to dry the coating. The dried coatings then have the desired thicknesses mentioned above.

The films may, furthermore, be coated, preferably in an off-line process using metals, such as aluminum, or ceramic materials, such as $SiO_x$ or $Al_xO_y$. This improves in particular their gas-barrier properties.

The polyester film of the invention preferably also comprises a second outer layer C. The structure, thickness and composition of a second outer layer may be selected independently of the outer layer already present. The second outer layer may also comprise the abovementioned polymers, UV absorbers, and/or polymer mixtures for the base layer or the first outer layer according to the invention, but these do not have to be identical with those of the first outer layer. The second outer layer may also comprise other common outer layer polymers, which may also have been provided with UV absorbers.

Between the base layer and the outer layer(s) there may also, if desired, be an intermediate layer. It may be composed of the polymers described for the base layers. In a particularly preferred embodiment it is composed of the polyester used for the base layer. It may also comprise the conventional additives described and the UV absorber. The thickness of the intermediate layer is generally greater than 0.3 μm and is preferably from 0.5 to 15 μm, in particular from 1.0 to 10 μm.

The thickness of the outer layer(s) is generally greater than 0.1 μm and preferably from 0.2 to 5 μm, in particular from 0.2 to 4 μm, and the outer layers may have identical or different thicknesses.

The overall thickness of the polyester film of the invention may vary within wide limits and depends on the application intended. It is preferably from 4 to 500 μm, in particular from 5 to 450 μm, preferably from 6 to 300 μm, and the base layer preferably makes up a proportion of from about 40 to 90% of the overall thickness.

Weathering tests have shown that, even after from 5 to 7 years in an outdoor application (extrapolated from the weathering tests), the UV-resistant films of the invention generally show no increase in yellowing, no embrittlement, no loss of surface gloss, no surface cracking, and no impairment of mechanical properties.

Another advantage is that the costs of producing the film of the invention are not significantly greater than those for a film made from standard polyester raw materials. The other properties of the film of the invention relevant to its processing and use remain essentially unchanged or are even improved. In addition, it has been ensured that a proportion of up to 50% by weight, preferably from 10 to 50% by weight of recycled material, based in each case on the total weight of the film, can be reused in producing the film, without any significant adverse effect on its physical properties.

In summary, the film of the invention has good thermoformability, impermeability to UV light, high UV resistance, and low gloss, in particular low gloss on film surface A, and relatively low haze. It also has good winding and processing performance. The good inscribability of the outer layer according to the invention with ballpoint pens, felt-tips or fountain pens is also worthy of mention.

The gloss of film surface A is lower than 70. In a preferred embodiment the gloss of this side is lower than 60, and in a particularly preferred embodiment it is lower than 50. The nature of this surface of the film is therefore particularly effective for sales promotion and it therefore has very particular suitability as the outward-facing surface of packaging.

The haze of the film is less than 40%. In a preferred embodiment it is less than 35%, and in a particularly preferred embodiment it is less than 30%. The comparatively low haze of the film (compared with a matt monofilm, see comparative example) means that the film can, for example, be reverse-printed, or viewing windows can be incorporated through which, for example, the contents can be clearly discerned.

The combination of advantageous properties gives the film of the invention excellent suitability for a wide variety of applications, for example for interior decoration, for the construction of exhibition stands, for exhibition requisites, as displays, for placards, for protective glazing of machinery or of vehicles, in the lighting sector, in the fitting out of shops or of stores, as a promotional requisite, a laminating medium, for greenhouses, roofing systems, exterior cladding, protective coverings, applications in the construction sector, and illuminated advertising profiles, blinds, and electrical applications, and also thermoforming applications.

Other application sectors are the production of labels and as a release film or stamping foil.

The table below (table 1) once again gives the most important film properties of the invention.

TABLE 1

|  | Range according to the invention | Preferred | Particularly preferred | Unit | Method of measurement |
|---|---|---|---|---|---|
| Gloss of side A (60° angle of measurement) | <70 | <60 | <50 |  | DIN 67 530 |
| Haze | <40 | <35 | <30 | % | ASTM D1003-52 |
| Coefficient of friction: Side A with respect to itself Side C and, respectively, side B with respect to itself | <0.6<br><0.5 | <0.55<br><0.55 | <0.50<br><0.55 |  | DIN 53 375 |
| Average roughness $R_a$ Side A | 200–600 | 230–550 | 250–530 | nm | DIN 4768 with a cut-off of 0.25 mm |
| Yellowness Index (YI) | <30 | <20 | <10 |  | DIN 6167 |
| High UV resistance | yes |  |  |  |  |
| Wavelength from which permeability to UV light begins | >350 | >360 |  | nm |  |
| Thermoformability | Yes |  |  |  |  |
| Orientation factor during thermoforming | 1.5–2.0 |  |  |  |  |
| Reproduction of detail during thermoforming | good |  |  |  |  |

The film has excellent suitability for packaging food and other consumable items which, in both these cases, are sensitive to light and/or to air, and also for producing moldings which are to provide UV protection or to be UV-resistant.

The following methods were used to characterize the raw materials and the films:

Methods

DIN=Deutsches Institut für Normung [German Institute for Standardization]

ISO=International Organization for Standardization
ASTM=American Society for Testing and Materials DEG Content/PEG Content, and IPA Content DEG content, PEG content, and IPA content is determined by gas chromatography after saponification in methanolic KOH and neutralization with aqueous HCl.

SV (DCA), and IV (DCA)

Standard viscosity SV (DCA) is measured by a method based on DIN 53726 in dichloroacetic acid.

Intrinsic viscosity (IV) is calculated as follows from standard viscosity

IV (DCA)=$6.67 \cdot 10^{-4}$ SV (DCA)+0.118

Coefficient of Friction

Coefficient of friction was determined to DIN 53 375, 14 days after production.

Surface Tension

Surface tension was determined by what is known as the ink method (DIN 53 364).

Haze

Film haze was measured to ASTM D1003-52. Hölz haze was determined by a method based on ASTM D1003-52, but in order to utilize the most effective measurement range, measurements were made on four pieces of film laid one on top of the other, and a 1° slit diaphragm was used instead of a 4° pinhole.

Gloss

Gloss was determined to DIN 67 530. The reflectance was measured, this being an optical value characteristic of a film surface. Based on the standards ASTM D523-78 and ISO 2813, the angle of incidence was set at 20° or 60°. A beam of light hits the flat test surface of the set angle of incidence and is reflected and/or scattered by this surface. A proportional electrical variable is displayed representing light rays hitting the photoelectronic detector. The value measured is dimensionless and must be stated together with the angle of incidence.

Roughness

Roughness $R_a$ of the film was determined to DIN 4768 with a cut-off of 0.25 mm.

Mechanical Properties

Modulus of elasticity and tensile stress at break, and tensile strain at break, are measured longitudinally and transversely to ISO 527-1-2.

Weathering (Bilateral), and UV Resistance:

UV resistance is tested as follows to the ISO 4892 test specification:

| Test equipment | Atlas Ci65 Weather-Ometer |
| Test conditions | ISO 4892, i.e. artificial weathering |
| Irradiation time | 1000 hours (per side) |
| Irradiation | 0.5 W/m², 340 nm |
| Temperature | 63° C. |
| Relative humidity | 50% |
| Xenon lamp | internal and external filter made from borosilicate |

-continued

| Irradiation cycles | 102 minutes of UV light, then 18 minutes of UV light with water sprayed onto the specimens, then again 102 minutes of UV light, etc. |

Numerical values <0.6 are negligible and mean that there is no significant color change.

Yellowness Index

Yellowness Index (YI) is the deviation from colorlessness in the "yellow" direction and is measured to DIN 6167. Yellowness Index values (YI)<5 are not visually detectable.

The examples and comparative examples below use films of varying thickness, produced on the extrusion line described.

All of the films were bilaterally weathered to test specification ISO 4892, in each case for 1000 hours per side, using the Atlas Ci65 Weather-Ometer, and then tested for mechanical properties, Yellowness Index (YI), surface defects, light-transmittance, and gloss.

The examples below illustrate the invention.

EXAMPLE 1 a) Preparation of component II for the outer layer mixture of the invention.

A copolyester containing about 90 mol % of isophthalic acid and 10 mol % of the sodium salt of 5-sulfoisophthalic acid, as acid component, and 100 mol % of ethylene glycol, as glycol component, was prepared by the following method:

A stainless-steel reaction vessel of 2 l capacity, equipped with an anchor stirrer, a thermal element for measuring the temperature of the vessel contents, an 18-inch Claisen/Vigreux distillation column with condenser and receiving vessel, an inlet opening and a heating jacket, was preheated to 190° C. and flushed with nitrogen. 1065.6 g of dimethyl isophthalate, 180.6 g of the sodium salt of dimethyl 5-sulfoisophthalate and 756.9 g of ethylene glycol were placed in the vessel. A buffer ($Na_2CO_3 \cdot 10H_2O$-0.439 g) and a transesterification catalyst ($Mn(OAc)_2 \cdot 4H_2O$-0.563 g, Ac=Acetate) were also placed in the vessel. The mixture was heated with stirring, whereupon methanol distilled off. During the distillation the temperature in the vessel was gradually increased to 250° C. When the distillate weight corresponded to the theoretical methanol yield, an excess of ethylene glycol solution comprising 0.188 g of phosphorous acid was added. The distillation column was replaced by a curved vapor take-off with receiving vessel. 20 g of pure ethylene carbonate were added to the reaction mixture, whereupon vigorous evolution of gas ($CO_2$) began immediately. $CO_2$ evolution subsided after about 10 min. A reduced pressure of 240 mm of Hg was then applied, and the polycondensation catalyst (0.563 g of $Sb_2O_3$ slurried in ethylene glycol) was added. The reaction mixture was stirred for 10 min while maintaining the reduced pressure of 240 mm of Hg after which the pressure was further reduced from 240 to 20 mm of Hg in steps of 10 mm of Hg/min. As soon as the pressure in the system had been reduced to 20 mm of Hg, the temperature in the vessel was raised from 250° C. to 290° C. at a rate of 2° C./min. When the temperature in the vessel had reached 290° C. the stirrer speed was throttled back and the pressure reduced to not more than 0.1 mm of Hg. At this juncture a read-out was obtained from the stirrer motor using an ammeter. The viscosity of the polymer was controlled by allowing the polycondensation to proceed in accordance with set values for the change in the ampere value from the stirrer motor of (in each case) 2–3 A. When the desired molecular weight had been achieved, nitrogen pressure was applied to the vessel to expel the liquid polymer from the outlet in the base of the vessel into an ice-water quenching bath.

B) Preparation of the mixture for outer layer A according to the invention 75% by weight of component I (polyethylene terephthalate with SV of 680) were fed with 15% by weight of component II and 10% by weight of a masterbatch which comprises the UV stabilizer to the inlet hopper of a twin-screw extruder and the two components were extruded together at about 300° C. and fed to the outer layer channel A of a coextrusion die.

The masterbatch is composed of 5% by weight of 2-(4, 6-diphenyl-1,3,5-triazin-2-yl)-5-hexyloxyphenol (®TINUVIN 1577 from Ciba-Geigy) as UV absorber and 95% by weight of polyethylene terephthalate.

At the same time, polyethylene terephthalate chips which have DEG content of 1.6% by weight and PEG content of 1.7% by weight were dried at 160° C. to a residual moisture level less than 50 ppm and fed to the extruder for the base layer. Polyethylene terephthalate chips which have DEG content of 1.6% by weight and PEG content of 1.7% by weight were fed with UV masterbatch and a filler to the extruder for the outer layer C. Coextrusion followed by stepwise longitudinal and transverse orientation was then used to produce a transparent three-layer film with ABC structure and an overall thickness of 12 µm. The thickness of each outer layer was 1.5 µm.

| Base layer B: | |
| --- | --- |
| 95% by weight | of polyethylene terephthalate with SV of 800, DEG content of 1.6% by weight, and PEG content of 1.7% by weight |
| 5% by weight | of masterbatch made from 99% by weight of polyethylene terephthalate and 1.0% by weight of silica particles (® Sylobloc 44 H from Grace) with average particle size 4.5 µm. |
| Outer layer A: | |
| 75% by weight | of component I, |
| 15% by weight | of component II, and |
| 10% by weight | of UV masterbatch made from 5% by weight of ® TINUVIN 1577 and 95% by weight of polyethylene terephthalate. |
| Outer layer C: | |
| 80% by weight | of polyethylene terephthalate with SV of 800, DEG content of 1.6% by weight, and PEG content of 1.7% by weight |
| 10% by weight | of masterbatch made from 99% by weight of polyethylene terephthalate and 1.0% by weight of silica particles (® Sylobloc 44 H from Grace) with average particle size 4.5 µm |
| 10% by weight | of UV masterbatch made from 5% by weight of ® TINUVIN 1577 and 95% by weight of polyethylene terephthalate. |

The individual steps of the process were:

| | | |
| --- | --- | --- |
| Longitudinal stretching | Temperature: | 85–135° C. |
| | Longitudinal stretching ratio: | 4.0:1 |
| Transverse stretching | Temperature: | 85–135° C. |
| | Transverse stretching ratio: | 4.0:1 |
| Setting | Temperature: | 230° C. |

EXAMPLE 2

Using a method based on example 1, a three-layer film of total thickness 12 µm was produced by coextrusion. Only the composition of the outer layer A was changed:

Outer Layer A:

70% by weight of component I

20% by weight of component II, and

10% by weight of UV masterbatch.

EXAMPLE 3

A coextruded film with the specification of example 1, the composition of the outer layer A being as follows:

65% by weight of component I

25% by weight of component II, and

10% by weight of UV masterbatch.

EXAMPLE 4

A coextruded film with the specification of example 1, the composition of the outer layer A being as follows:

55% by weight of component I

35% by weight of component II, and

10% by weight of UV masterbatch.

COMPARATIVE EXAMPLE

A monofilm was produced, its composition being the same as the outer layer A of example 3, but the film comprises no UV absorber and does not have the relatively high DEG content, and nor is any PEG present in the film. The film surfaces had the required mattness, but the film did not meet the requirements placed upon it, because its haze was excessive. It was also very difficult to produce the film by a process which was reliable and therefore cost-effective.

The film is moreover not UV-resistant and transmits harmful UV light. After 1000 hours of weathering the film exhibits cracking and embrittlement phenomena, and also visible yellowing.

The thermoformability of the film was inadequate.

The results of the examples and comparative example (CE) are given in table 2 below:

TABLE 2

| Example No. | Film thickness (μm) | Outer layer thickness A/C (μm) | Film structure | Gloss (60° angle of measurement) Side A | Gloss (60° angle of measurement) Side C | Haze | Permeability to radiation (nm) |
|---|---|---|---|---|---|---|---|
| 1 | 12 | 1.5/1.5 | ABC | 65 | 175 | 25 | >360 |
| 2 | 12 | 1.5/1.5 | ABC | 55 | 175 | 26 | >360 |
| 3 | 12 | 1.5/1.5 | ABC | 45 | 175 | 28 | >360 |
| 4 | 12 | 1.5/1.5 | ABC | 35 | 175 | 30 | >360 |
| CE | 12 | | A | 35 | 160 | 70 | >280 |

After 1000 hours of weathering using the Atlas Ci65 Weather-Ometer, the films of examples 1 to 4 exhibit no embrittlement, no cracking, and Yellowness Indices <10. The film from examples 1 to 4 can be thermoformed to give moldings, without predrying, on commercially available thermoforming machinery, e.g. from the company Illig (Germany). The reproduction of detail in the thermoformed parts is excellent, and their surface is homogeneous.

What is claimed is:

1. A polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolymer or polyethylene terephthalate copolymer or a mixture made from polyethylene terephthalate homopolymer or polyethylene terephthalate copolymer, and component II is a polymer which contains at least one sulfonate group.

2. A polyester film as claimed in claim 1, wherein the film comprises at least one intermediate layer between the base layer (B) and the outer layer (A).

3. The polyester film as claimed in claim 1, which has an additional outer layer (C) arranged on the opposite surface of base layer (B) on which the matt outer layer (A) is arranged and which film has an A-B-C layer structure, wherein the outer layers A and C may be identical or different.

4. The polyester film as claimed in claim 1, wherein the base layer (B) is composed of at least 70% by weight of a thermoplastic polyester.

5. The polyester film as claimed in claims 1, wherein the thermoplastic polyester comprises polyethylene terephthalate or a polyester composed of at least 90 mol % of ethylene glycol units and terephthalic acid units or of ethylene glycol units and naphthalene-2,6-dicarboxylic acid units.

6. The polyester film as claimed in claim 1, wherein component II of the mixture or of the blend of the outer layer (A) is a copolymer which is composed of the condensation product of isophthalic acid and of at least one sulfomonomer which has an alkali metal sulfonate group on the aromatic moiety of a dicarboxylic acid, and of a copolymerizable aliphatic or cycloaliphatic glycol, or of derivatives of these which are capable of forming polyesters.

7. The polyester film as claimed in claim 6, wherein the copolymer is composed of the condensation product of isophthalic acid and of of at least one aliphatic dicarboxylic acid of the formula HOOC(CH$_2$)$_n$COOH, where n=from 1 to 11, and of at least one sulfomonomer which has an alkali metal sulfonate group on the aromatic moiety of a dicarboxylic acid, and of a copolymerizable aliphatic or cycloaliphatic glycol, or of derivatives of these which are capable of forming polyesters.

8. The polyester film as claimed in claim 6 or 7, wherein the monomers used to form component II are present in the following molar ratios: isophthalic acid from 65 to 95 mol %, aliphatic dicarboxylic acid from 0 to 30 mol %, sulfomonomer from 5 to 15 mol %, and the stoichiometric amount of glycol needed to form 100 mol %.

9. The polyester film as claimed in claim 1, wherein the UV absorber is present in the base layer or in the outer layers or in the base layer and in the outer layers.

10. The polyester film as claimed in claim 1, wherein the UV absorber comprises 2-hydroxybenzotriazoles or triazines or a mixture of these UV absorbers.

11. The polyester film as claimed in claim 1, wherein the UV absorber comprises 2-(4,6-diphenyl-1,3,5-triazin-2-yl)-5-hexyloxyphenol or 2,2'-methylene-bis-6-(2H-benzotriazol-2-yl)-4-(1,1,2,2-tetra-methylpropyl)phenol or a mixture of these UV absorbers or a mixture of these UV absorbers with other UV absorbers.

12. The polyester film as claimed in claim 1, wherein the concentration of the UV absorber is from 0.01 to 5% by weight, based on the weight of the layer in which it is present.

13. The polyester film as claimed in claim 1, which additionally has a functional coating on at least one surface.

14. A process for producing the polyester film as claimed in claim 1, wherein the starting materials required for producing the base and outer layer are coextruded by way of one or more extruders through a coextrusion die and the resultant film is biaxially oriented and heat-set.

15. The process as claimed in claim 14, wherein a UV absorber is added by way of masterbatch technology.

16. A method of making a molding which comprises converting a polyester film as claimed in claim 1 into a molding.

17. A molding comprising a polyester film as claimed in claim 1.

18. A polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolymer or polyethylene terephthalate copolymer or a mixture made from polyethylene terephthalate homopolymer or polyethylene terephthalate copolymer, and component II is a polymer which contains at least one sulfonate group,
    wherein the polyethylene terephthalate of the base layer (B) has a diethylene glycol content or a polyethylene glycol content or a diethylene glycol content and a polyethylene glycol content greater than 1.3% by weight.

19. A polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolymer or polyethylene terephthalate copolymer or a mixture made from polyethylene terephthalate homopolymer or polyethylene terephthalate copolymer, and component II is a polymer which contains at least one sulfonate group, wherein the polyethylene terphthalate of the base layer (B) has a diethylene glycol content or a polyethylene glycol content or a diethylene glycol content and a polyethylene glycol content of from 1.6 to 5% by weight.

20. A thermoformable, biaxially oriented polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolymer or polyethylene terephthatale copolymer or a mixture made from polyethylene terephthalate homopolymer or polyethylene terephthalate copolymer, and component II is a polymer which contains at least one sulfonate group, wherein the polyethylene terephthalate of the base layer (B) has at least one of (i) a diethylene glycol content or (ii) a polyethylene glycol content of at least about 1.0% by weight.

21. A thermoformable, biaxially oriented polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolymer or polyethylene terephthalate copolymer or a mixture made from polyethylene terephthalate hompolymer or polyethylene terephthalate copolymer, and component II is a polymer which contains at least one sulfonate group, wherein the polyethylene terephthalate of the base layer (B) has a diethylene glycol content of at least about 1.3% by weight and a polyethylene glycol content of at least about 1.3% by weight.

22. A thermoformable, biaxially oriented polyester film which has a base layer (B) made from a thermoplastic polyester and has at least one matt outer layer (A), and wherein the film comprises at least one UV absorber, wherein the matt outer layer (A) comprises a mixture or a blend or a mixture and a blend made from two components I and II, wherein component I is essentially a polyethylene terephthalate homopolyer or polyethylene terephthalate copolymer or a mixture made from polyethylene terephthalate homopolymer or polyethylene terephthalate copolymer, and component II is a polymer which contains at least one sulfonate group, wherein the at least one UV absorber is a mixture of 2-(4,6-diphenyl-1,3,5-triazin-2-yl)-5-hexyloxyphenol and 2,2-methylenebis(6-(2H-benzotriazol-2-yl)-4-(1,1,2,2,-tetramethylpropyl)-phenol.

23. A thermoformable biaxially oriented polyester film which has a base layer (B) made from a thermoplastic polyester disposed between first and second outer layers.

wherein said first outer layer is a matt layer comprising at least one UV absorber within a mixture or a blend or a mixture and a blend made from two components I and II, wherein component I is essentially a polyethylene terephthalate homopolymer or polyethylene terephthalate copolymer or a mixture made from polyethylene terephthalate homopolymer or polyethylene terephthalate copolymer, and component II is a polymer which contains at least on sulfonate group and said second outer layer comprises at least one UV absorber, and UV absorber is absent from the base layer (B).

* * * * *